March 28, 1944. H. P. WOHNSIEDLER ET AL 2,345,543
CATIONIC MELAMINE-FORMALDEHYDE RESIN SOLUTIONS
Filed July 31, 1942
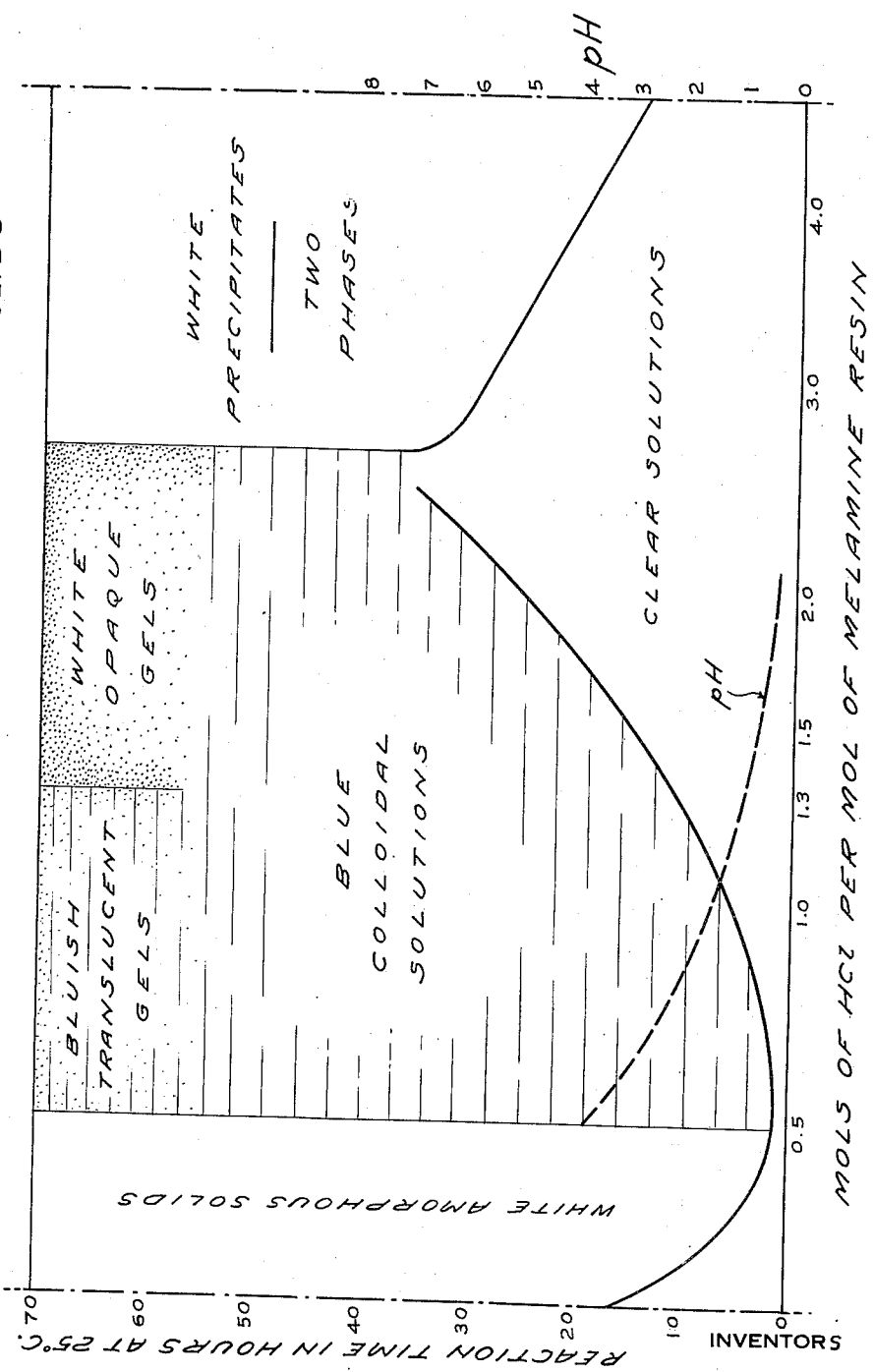
INVENTORS
HENRY P. WOHNSIEDLER,
BY WALTER M. THOMAS,
Wm. P. Spielman ATTORNEY Patented Mar. 28, 1944

2,345,543

UNITED STATES PATENT OFFICE 2,345,543

CATIONIC MELAMINE-FORMALDEHYDE RESIN SOLUTION

Henry P. Wohnsiedler, Darien, and Walter M. Thomas, Stamford, Conn., assignors to American Cyanamid Company, New York, N. Y., a corporation of Maine Application July 31, 1942, Serial No. 453,120

3 Claims. (Cl. 260—72)

This invention relates to compositions containing aminotriazine-aldehyde condensation products, and more particularly to colloidally dispersed aminotriazine-aldehyde resins having novel characteristics.

Aminotriazine-aldehyde condensation products such as melamine-formaldehyde resins, ammeline-formaldehyde resins and resins prepared by condensing formaldehyde with guanamines have previously been prepared, both in the form of completely cured resins and in the form of water-soluble or organic solvent-soluble intermediates. The present invention relates, however, to a new class of aqueous solutions of partially polymerized condensation products of these types in a colloidally dispersed condition wherein the condensation products possess new and hitherto unsuspected properties.

We have discovered that aminotriazine-aldehyde condensation products, when prepared in the presence of definite quantities of free acid or subsequently reacted with these same quantities of acid after their preparation by other methods, can be converted into colloidal dispersions wherein positive electrical charges are carried by the colloidal particles of the resin. In this condition the resin solutions or colloidal dispersions exhibit several unusual properties of commercial importance, and particularly the property of migration of the resin particles toward the cathode upon electrophoresis of the dispersion.

This invention is directed to colloidal dispersions of cationic melamine-formaldehyde condensation products. Other cationic aminotriazine-aldehyde resin solutions are described and claimed in certain copending applications that will be identified hereinafter.

The colloidal solutions or dispersions of cationic aminotriazine-aldehyde resins may be prepared by the use of aminotriazines or aminotriazine salts as starting materials, or they may be prepared from aminotriazine-aldehyde condensation products produced by conventional methods. In either method of preparation, however, we first prepare condensation products or resins of a particular type which are defined hereinafter as "acid-type" resins or condensation products. The acid-type aminotriazine-aldehyde condensation products are readily identified by the following characteristics:

(1) When freshly prepared they form clear solutions in both water and acids.

(2) The clear aqueous solutions are converted upon aging, first to hydrophilic colloids, then to a water-dispersible gel stage, and finally upon drying to a water-insoluble resin.

(3) In the case of melamine-formaldehyde condensation products the composition contains from 2 to 2.5 moles of combined formaldehyde for each mole of melamine. However this is not necessarily true of the aldehyde condensation products of formoguanamine, acetoguanamine, ammeline and other amino-triazines.

(4) The pH of a 15% aqueous solution of acid-type melamine-formaldehyde resin is always less than 4.0 and is usually below 3.0. The ratio of acid to melamine in these resins varies with the type of acid used being, in general, greater for weaker acids than for stronger ones. Optimum pH values and acid ratios for typical acids are shown in Example 2.

We have discovered that aqueous solutions of the acid-type melamine-formaldehyde condensation products will undergo a progressive polymerization that is characterized by a gradual increase in the size of the resin particles until the colloidal range is reached. In this colloidal range we have discovered that the partially polymerized melamine-formaldehyde resin carries a definite positive electric charge, as is shown by its migration toward the cathode upon electrophoresis of the solution. This is an extremely important property in a solution of a heat-curable thermosetting resin, for it provides a ready method of obtaining a controlled deposition of the resin in extremely thin films on metallic surfaces and also on negatively charged materials such as cellulosic fibers. Thus, for example, a remarkable improvement in the wet strength of paper is obtained by adding the positively charged colloidal solutions of the present invention to well-beaten paper stock before it is formed into a finished sheet, as is described in detail in the copending application of Chester G. Landes and Charles S. Maxwell, Serial No. 453,032, filed July 31, 1942.

The elapsed time necessary for aging a clear solution of an acid-type melamine-formaldehyde resin to the colloidal condition in which it carries a positive electric charge is dependent upon the aging conditions. In general, the aging process is shortened by increasing either the temperature or the concentration of the acid-type resin solution, or by decreasing the amount of acid present. The effects of variations in these factors are shown in the following table, wherein the resin under test was prepared as described in Example 1, paragraph 1, dissolved in boiling water, cooled and the correct amount of hydrochloric acid added.

| Resin conc., per cent | Resin: HCl ratio (mols) | Aged at 70° F. | | | Aged at 85° F. | |
|---|---|---|---|---|---|---|
| | | 24 hours | 48 hours | 72 hours | 24 hours | 48 hours |
| 20 | 1:1 | Sl. haze | Blue haze | Gelled | Blue haze | Gelled. |
| 10 | 1:1 | Clear | Sl. haze | Blue haze | Sl. haze | Blue haze. |
| 20 | 1:2 | ---do--- | ---do--- | White ppt | White gel | |
| 10 | 1:2 | ---do--- | Clear | Blue haze | Clear | Sl. haze. |
| 20 | 1:3 | Sl. ppt | Heavy ppt | | Heavy ppt | |
| 10 | 1:3 | Clear | Clear | White ppt | Clear | White ppt |

The formation of a colloidal solution is shown in the first instance by the presence of a definite Tyndall effect under the influence of a beam of light or in the dark-field microscope. Although the colloidal solution is infinitely dilutable with water it is extremely acid-sensitive, and this constitutes a very delicate test to determine whether any colloidal acid-type resin is present. When a strong acid such as 6N hydrochloric acid is added to a clear acid-type resin solution that has not been aged no immediate change occurs, but when the acid-type resin has been aged for a time sufficient to bring even a small part of the resin particles within the colloidal range these particles are precipitated by the addition of the acid. This reaction with strong acids can be used to estimate the degree of polymerization of the resin solution since the amount of acid necessary for precipitation becomes less with increasing age of the solution. The colloidal range of polymerization is easily apparent upon visual observation, for the originally clear solution of cationic melamine-formaldehyde resin develops a characteristic bluish haze when the colloidal solution has been formed.

Although the above tests are useful methods of identifying the colloidal solutions of partially polymerized melamine-formaldehyde resins of the present invention, the most comprehensive test consists in the passage of a direct current through the solution. When the solutions of the present invention are subjected to electrophoresis in this manner the existence of a definite positive electric charge is shown by the migration of the colloidal resin toward the cathode, and this is an essential characteristic that is common to all the resin solutions of the present invention. The cataphoresis is preferably carried out by passing a direct current of 90–120 volts through platinum electrodes immersed in the colloidal solution, a typical method of procedure being illustrated in Example 3.

Aminotriazines containing one, two or three reactive amino groups such as ammeline, ammelide, formoguanamine, acetoguanamine, propionoguanamine and N-substituted guanamines such as 4N-methyl- or 4N-ethyl-2-acetoguanamines may be reacted with formaldehyde or other suitable aldehydes to form a resin which may be used to prepare cationic, colloidally dispersed resin solutions. However, these resins are not claimed as a part of the present invention, since they are described and claimed in our copending applications Serial Nos. 507,626 and 507,627, filed October 25, 1943.

Water-soluble products prepared by heating the formaldehyde condensation products of melamine or other aminotriazines with lower aliphatic alcohols such as methanol in the presence of small amounts of an acid catalyst may also be used. Although cationic resin solutions can be prepared from aldehyde condensation products of any of the aminotriazines, the melamine-formaldehyde resins constitute the preferred class of products for preparing the positively charged resin solutions of the present invention, since melamine is relatively cheap and available in large quantities.

Colloidal aqueous solutions of partially polymerized, positively charged melamine-formaldehyde resins having a glass electrode pH value within the range of 0.5 to about 3.5 constitute a representative but preferred class of the compounds of the present invention, and a typical solution of this type is illustrated on the accompanying drawing. In this drawing the positively charged, colloidal melamine resin solution is shown in the area marked "blue colloidal solutions," being bounded on both sides by the white precipitates which form when not enough acid or too much acid, respectively, is added. When the proper quantities of acid are used the colloidal range is preceded by the clear aqueous solutions of acid-type melamine resin which are converted into the colloidal condition upon aging, and is followed by gels which form when the aging has been carried on for too long a time. It will thus be seen that the positively charged, colloidal melamine-aldehyde solutions constitute an intermediate stage between freshly prepared, clear solutions and undispersible white or bluish gels resulting from excessive aging, on the one hand, and between white precipitates that form by using too much or too little acid on the other hand, and this is true of all the positively charged, colloidal aminotriazine-aldehyde resin solutions of the present invention.

Any reactive melamine-formaldehyde resin can be prepared as or converted into a positively charged colloidal solution by following the conditions outlined in the drawing. In every case, however, optimum amounts of acid within the range of about 0.5–3.5 moles per mole of melamine should be employed, and the resulting clear solutions should be reacted by aging to a degree of polymerization less than that which characterizes the state of undispersible gel and precipitate formation, but sufficient to bring the particles thereof within the colloidal range. All the colloidal aqueous solutions of the present invention are therefore characterized by having a glass electrode pH value within the range of about 0.5 to about 3.5, a degree of polymerization sufficient to bring the resin particles within the colloidal range, and a definite positive electric charge as shown by the migration of the resin to the cathode upon electrophoresis of the solution. They are also characterized by a content of about 2–2.5 moles of formaldehyde for each mole of melamine and a definite blue haze in their colloidal solutions.

The invention will be illustrated in greater detail by the following specific examples. In the interests of clarity the greater part of the experimental data in these examples is presented with reference to a relatively few specific compounds, but it should be understood that similar results are obtainable with all the acid-type aminotriazine-aldehyde resins and the invention in its broader aspects is not limited by these examples.

Example 1

A methylol melamine having a ratio of formaldehyde to melamine of 3.33:1 was prepared by heating together three moles of melamine with 10 moles of 30% formaldehyde having a pH of 9.0 for about 30 minutes, cooling, and separating and drying the resulting crystals.

Hexamethylol melamine was prepared by heating 1 mole of melamine and 8 moles of neutral 32% aqueous formaldehyde solution on a boiling water bath until a clear solution was obtained, and then for 10 minutes longer. The product was allowed to crystallize and after two days was filtered, washed with alcohol and dried 5 hours at 60° C.

15% solutions of these resins in water were prepared concentrated hydrochloric acid was added in amounts such that the solutions contained 1 mole of HCl for each mole of combined melamine. The acidified solutions were then heated at 50° C. for a total of 4 hours, during which samples were taken every 15 minutes during the first hour and every hour thereafter and titrated for free (uncombined) formaldehyde. It was found that both the resins liberated considerable quantities of free formaldehyde during the first hour of heating and small quantities during the second hour, but no more formaldehyde was given off during the last two hours. After heating for two hours the amount of combined formaldehyde in the two resins was almost identical, and amounted to approximately 2.5 moles per mole of melamine.

One mole of HCl was then added to each of two freshly prepared mixtures containing one mole of melamine and 3 moles and 6 moles, respectively, of 32% aqueous formaldehyde solution, and these mixtures were heated for 4 hours at 50° C. Determinations of the free (uncombined) formaldehyde in the mixture containing 6 moles of formaldehyde showed that only 2.5 moles were combined with the melamine after 2 hours heating, and no further amounts were combined after heating for an additional 2 hours. In the other solution, which contained only 3 moles of formaldehyde for each mole of melamine, approximately 2 moles of formaldehyde were combined after the first two hours and very little more entered into combination during the remainder of the heating period.

From the foregoing it is evident that the effect of equimolecular amounts of hydrochloric acid on a melamine-formaldehyde resin is to produce a final product containing approximately 2-2.5 moles of combined formaldehyde for each mole of melamine. The foregoing experiment has been repeated with phosphoric acid, acetic acid, sulfurous acid and other water-soluble acids replacing the hydrochloric acid in amounts sufficient to produce a pH of about 0.5 to about 3.5 in the solution, and in all cases the results are substantially the same as those described above. It is evident, therefore, that formaldehyde in excess of about 2-2.5 moles is liberated from methylol melamines by the addition of these quantities of acids, and that no more than this quantity of formaldehyde can be made to combine in their presence.

When less than 2 moles of formaldehyde are reacted with 1 mole of melamine in the presence of enough acid to produce a pH of about 0.5 to about 3.5, pastes and solutions of only transient stability are obtained rather than gels or clear resins. Results identical with those obtained in water solution are also obtained when the reactions are carried out in the presence of alcoholic solutions, provided that at least 10% of water is present. With methylol melamines and dry HCl reaction in absolute alcohol leads to soluble products which, however, do not have the characteristics of the aqueous reaction products and will not form colloidal, positively charged resin solutions upon aging.

Example 2

In the production of positively charged melamine-formaldehyde condensation products which will migrate to the cathode upon electrophoresis the molar ratio of acid to melamine is critical and depends on the type of acid and the time and temperature of the condensation reaction. The effect of these variables is illustrated in the accompanying drawing, which shows the effect of progressive additions of hydrochloric acid to a melamine resin solution at 15% solids. The resin used was a melamine-formaldehyde resin containing 3.3 moles of formaldehyde for each mole of melamine, prepared as described in the first paragraph of Example 1.

Upon the addition of relatively small amounts of hydrochloric acid to the solution a precipitation of a white amorphous resin occurs, and this condition persists until a pH of about 3.5 is obtained, corresponding to about 0.5 mole of HCl. A transition zone is reached next, where cloudy solutions setting to cloudy or opaque gel-like resins are obtained, particularly upon long standing. With a slightly increased acid content, the product is a clear solution which passes on aging into a blue colloidal solution and then to a clear bluish, water-dispersible gel which can be redispersed to a positively charged, colloidal solution by dilution with water and continued agitation. However, these gels finally become undispersible on continued aging and set to clear insoluble resins on drying. Further increases in acid result in the formation of clear solutions which pass through the stage of partial polymerization wherein the resin is positively charged, but finally form white opaque gels after standing for several days. With a large excess of acid on the order of 3 or more moles of HCl a two-phase system is encountered (containing liquid together with amorphous precipitate) which is quite similar to those observed with insufficient acid.

It should be understood that the molar ratios of acid shown in this chart will vary with the type of acid. In general, larger quantities of weaker acids such as acetic and phosphoric acids are necessary than with hydrochloric acid, but in all cases the pH range wherein the positively charged colloidal solutions are obtained lies between about 0.5 and about 3.5. The optimum pH values and acid ratios for typical acids is shown in the following table.

| Acid | Moles acid per mole melamine | Optimum pH (15% solution) |
|---|---|---|
| HCl | 0.7–1.3 | 1.5 |
| HCOOH | 1.6–2.5 | 3 |
| CH₃COOH | >2–3+ | 3 |
| H₃PO₄ | >2–3+ | 3 |
| H₂SO₄ | 0.5–1 | 1.5 |

Example 3

Representative melamine-formaldehyde resin solutions were prepared by the following procedures:

*Resin 1.*—A mixture of 126 parts by weight of melamine (1 mole), 330 parts of 30% formaldehyde (3.3 moles) and 36.5 parts of HCl (1 mole) in the form of concentrated hydrochloric acid, having an initial pH of 0.4, were reacted for 30 minutes at 25° C., diluted with water to 10% solids, and aged 5 days at room temperature.

Resin 2.—1 mole of melamine, 3 moles of 32% aqueous formaldehyde solution and 1 mole of HCl were heated at 100° C. for one hour, then aged 24 hours at room temperature.

Resin 3.—5 grams of the resin described in Example 1, first paragraph, were dissolved in 20 cc. of water and 1.8 cc. of concentrated hydrochloric acid were added to give a pH of 1.6. The solution was then aged at room temperature for 24 hours.

Resin 4.—This was a non-acid type resin solution, prepared by heating a mixture of 1 mole of melamine and 3 moles of 37% aqueous formaldehyde neutralized with NaOH to a pH of 7.2 for 30 minutes at 60° C. after which the pH was raised to 9.5. This solution had approximately 59% solids.

These resin solutions were subjected to electrophoresis between platinum electrodes. A preliminary experiment on Resin #1 was first made in an ordinary U-tube with an electrode inserted into each arm, and gave positive results which demonstrated that the blue haze of the colloidal melamine-formaldehyde resin solutions did actually move to the cathode; in fact, a sizable amount of resin was actually deposited upon the electrode itself. However, the presence of hydrochloric acid resulted in the liberation of chlorine on the anode and caused a flocculation of resin from the solution.

A modified cell was therefore constructed in which the blue resin solution was covered with a layer of clear distilled water to permit easy observation of the migration and also to prevent the high rate of electrolysis caused by the electrolytes in the solution. All the above resin solutions were subjected to ca. phoresis in this cell, using platinum electrodes having an area of approximately 1 square inch and 120 volts potential. The amperage varied considerably due to the varying amounts of electrolytes contained in the solution.

The following table shows the results of these tests:

|  | Resin No. | | | | |
| --- | --- | --- | --- | --- | --- |
|  | 1 | 1 | 2 | 3 | 4 |
| Duration hours | 6 | 23 | 65 | 16 | 17. |
| Migration towards | Cathode | Cathode | Cathode | Cathode | Anode. |
| Gel deposited | Yes | Yes | Yes | Yes | No. |
| pH of solution: |  |  |  |  |  |
| Start |  |  | 1.1 | 1.6 | 8.75. |
| End |  |  | 1.1 |  | 8.75. |

In every case where an acidified and aged resin solution was used the colloidal resin migrated towards the cathode and therefore had a positive electrical charge. The solution of Resin #4, which was not acidified and had a pH of 8.75 actually migrated to the anode as shown by nitrogen analysis.

What we claim is:

1. A colloidal aqueous solution of a partially polymerized, positively charged melamine-formaldehyde condensation product having a glass electrode pH value within the range of about 0.5 to about 3.5 when measured at 15 percent solids, said condensation product containing about 2–2.5 moles of combined formaldehyde for each mole of melamine and having a degree of polymerization less than that which characterizes gels and precipitates which are undespersible by agitation with water but sufficient to bring the particles thereof within the colloidal range, said condensation product having a definite positive electrical charge as shown by its migration toward the cathode upon electrophoresis of the solution.

2. A colloidal aqueous solution of a partially polymerized, positively charged melamine-formaldehyde condensation product containing about 0.7 to 1.3 moles of hydrochloric acid for each mole of melamine, said condensation product containing about 2–2.5 moles of combined formaldehyde for each mole of melamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

3. A colloidal aqueous solution of a partially polymerized, positively charged melamine-formaldehyde condensation product containing about 2 to 3 moles of phosphoric acid for each mole of melamine, said condensation product containing about 2–2.5 moles of combined formaldehyde for each mole of melamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

HENRY P. WOHNSIEDLER.
WALTER M. THOMAS.